(12) United States Patent
Zhang

(10) Patent No.: US 10,773,767 B2
(45) Date of Patent: Sep. 15, 2020

(54) FOLDING DRIVE MECHANISM OF FOLDING SCOOTER

(71) Applicant: DONGGUAN PRESTIGE SPORTING PRODUCTS CO., LTD., Dongguan (CN)

(72) Inventor: Zhao Zhang, Dongguan (CN)

(73) Assignee: DONGGUAN PRESTIGE SPORTING PRODUCTS CO., LTD., Dongguan (CN)

( * ) Notice: Subject to any disclaimer, the term of this patent is extended or adjusted under 35 U.S.C. 154(b) by 96 days.

(21) Appl. No.: 16/311,468

(22) PCT Filed: Jul. 19, 2017

(86) PCT No.: PCT/CN2017/093499
§ 371 (c)(1),
(2) Date: Dec. 19, 2018

(87) PCT Pub. No.: WO2018/014843
PCT Pub. Date: Jan. 25, 2018

(65) Prior Publication Data
US 2019/0241230 A1    Aug. 8, 2019

(30) Foreign Application Priority Data
Jul. 21, 2016 (CN) .......................... 2016 1 0580244

(51) Int. Cl.
*B62K 15/00* (2006.01)
*B62K 5/007* (2013.01)

(52) U.S. Cl.
CPC ............ *B62K 15/008* (2013.01); *B62K 5/007* (2013.01); *B62K 15/006* (2013.01); *B62K 2015/001* (2013.01)

(58) Field of Classification Search
CPC ..... B60K 15/00; B60K 15/006; B60K 15/008
See application file for complete search history.

(56) References Cited

U.S. PATENT DOCUMENTS

| 7,654,356 | B2 | 2/2010 | Wu |
| 2003/0230869 | A1 | 12/2003 | Beresnitzky |

(Continued)

FOREIGN PATENT DOCUMENTS

| CN | 201660071 U | 12/2010 |
| CN | 202541736 U | 11/2012 |

(Continued)

OTHER PUBLICATIONS

Zhao Zhang, Folding drive structure of folding bicycle, Oct. 16, 2015, EPO, CN 104691683 A, Machine Translation of Description (Year: 2015).*

*Primary Examiner* — James A English
(74) *Attorney, Agent, or Firm* — Shimokaji IP

(57) ABSTRACT

A folding drive mechanism of a folding scooter is provided between a front frame (110) and a rear frame (120) of the folding scooter, and the front frame (110) and the rear frame (120) are pivoted. The folding drive mechanism (130) comprises a drive rod (1) and a pull rod (2), wherein the drive rod (1) is pivoted on the rear frame (120) via a middle shaft (120a), one end of the pull rod (2) is pivoted on the front frame (110), the other end of the pull rod (2) is connected to the drive rod (1) to drive the drive rod (1), enabling the drive rod (1) to swing to drive the pull rod (2) so that the front frame (110) is driven to rotate and fold relative to the rear frame (120). The folding scooter is fast to fold, and convenient.

9 Claims, 8 Drawing Sheets

(56) References Cited

U.S. PATENT DOCUMENTS

| | | |
|---|---|---|
| 2009/0308676 A1 | 12/2009 | Wang |
| 2012/0193943 A1 | 8/2012 | Wu et al. |
| 2015/0209205 A1* | 7/2015 | Ransenberg ......... A61G 5/0883 |
| | | 280/641 |
| 2017/0247075 A1* | 8/2017 | Kano ..................... B62K 3/002 |
| 2018/0271726 A1* | 9/2018 | Wang ....................... B62M 6/90 |
| 2018/0338877 A1* | 11/2018 | Kano ..................... A61G 5/047 |
| 2019/0168837 A1* | 6/2019 | Zhang .................... B62K 21/16 |

FOREIGN PATENT DOCUMENTS

| | | |
|---|---|---|
| CN | 104097725 A | 10/2014 |
| CN | 104691683 A | 6/2015 |
| CN | 204659922 U | 9/2015 |
| CN | 106114729 A | 11/2016 |
| CN | 106184549 A | 12/2016 |
| CN | 205916265 U | 2/2017 |
| CN | 205916266 U | 2/2017 |
| WO | 2014083388 A1 | 6/2014 |

* cited by examiner

FOLDING DRIVE MECHANISM OF FOLDING SCOOTER

FIELD OF THE INVENTION

The present invention relates to a folding scooter, and more particularly to a folding drive mechanism with quick and convenient folding and unfolding operations.

BACKGROUND OF THE INVENTION

Currently, the existing folding electric scooters are manually folded, which have complicated folding and unfolding operations. The folding step is cumbersome, and the folding speed is slow, which is quite inconvenient. Further, for people with mobility difficulties, manual operation spends a lot of time and effort, thus it is inconvenient for those who are physically disabled.

SUMMARY OF THE INVENTION

One objective of the present invention is to provide a folding drive mechanism with quick and convenient folding and unfolding operations.

To achieve the above-mentioned objective, the present invention provides a folding drive mechanism of a folding scooter, arranged between a front frame and a rear frame of the folding scooter which are pivotally connected, and the folding drive mechanism comprises a drive rod and a pull rod, the drive rod is pivoted on the rear frame via a center shaft, one end of the pull rod is pivoted on the front frame, and another end of the pull rod is connected to the drive rod, by driving the drive rod, the pull rod is actuated to cause the front frame to pivot relative to the rear frame thereby folding.

In comparison with the prior art, the drive rod is pivotally connected to the rear frame and connected to the pull rod, and the pull rod is pivotally connected to the front frame, thus the pull rod can be actuated by the drive rod; further, the front frame is pivotally connected to the rear frame, therefore the front frame is can be actuated by the pull rod to approach the rear frame, thereby folding the whole frame. The structure of the present invention is simple, and the operations for folding and unfolding are simplified and quick, thereby improving the convenience.

Preferably, the folding drive mechanism of a folding scooter further includes a first hook, wherein one end of the pull rod is provided with a first slot, a first shaft pin provided at a lower end of the drive rod is movably inserted into the first slot, one end of the first hook is pivoted on the front frame, another end of the first hook is hooked on the rear frame, and a second shaft pin is provided at a middle of the drive rod and pressed against the first hook; when folding, the drive rod is rotated to cause the second shaft pin to push the first hook to disengage from the rear frame, thereby enabling the front frame to fold relative to the rear frame. The drive rod is pivoted on the rear frame, the pull rod is pivoted on the front frame, the first elongated slot is formed at the end of the pull rod, and the first shaft pin of the drive rod is inserted into the first elongated slot. Further, the first hook is hooked on the rear frame, and the second shaft pin of the drive rod is pressed against the first hook, thus the front frame and the rear frame are locked in the unfold position. When folding, the drive rod is driven to rotate to cause the first hook to disengage from the rear frame, thereby unlocking the front frame and the rear frame; continuing to swing the drive rod, the pull rod is linked, so that the front frame and the rear frame can be folded. By this token, the folding frame can be folded or unfolded quickly only by driving the drive rod, and the operation is simple and convenient.

Preferably, the folding drive mechanism of a folding scooter further includes a first spring configured between the front frame and the first hook. By means of the first spring, the first hook can hook on the center shaft automatically when the front frame and the rear frame completely unfolded, so that the rear frame can be locked thereby preventing an unexpected folding and improving safety accordingly.

Preferably, the folding drive mechanism of a folding scooter further includes a second hook pivoted on the front frame, after folding, the second hook is hooked on the rear frame. By means of the second hook, the folding position of the front frame and the rear frame can be locked.

Preferably, the folding drive mechanism of a folding scooter further includes a linkage assembly for driving the second hook to engage with or disengage from the rear frame.

Preferably, the linkage assembly comprises an trigger bar pivoted on the front frame and a connecting bar, and two ends of the connecting bar are connected to the trigger bar and the second hook respectively, the lower end of the drive rod is provided with an trigger part; before unfolding, the trigger part is driven by the trigger bar, so as to push the second hook to disengage from the rear frame. By means of the trigger part, and the linkage between the trigger bar and the connecting bar, the second hook can be actuated firstly during the rotation of the drive rod to disengage from the rear frame, thereby unlocking the front frame and the rear frame.

Preferably, the linkage assembly further comprises a second spring configured between the front frame and the rear frame, thereby enabling the second hook to hook on the rear frame. By means of the second spring, the front frame and be locked with the rear frame automatically when the front frame and the rear frame are completely folded, thereby preventing an unexpected unfolding.

Preferably, the folding drive mechanism of a folding scooter further includes an automatic actuator assembly including a linear actuator and a push shaft, an rear end of the linear actuator is pivoted on the rear frame, the push shaft is fixed to a telescopic end of the linear actuator, and the drive rod is driven by an end of the push shaft. In such a way, the drive rod can be rotated automatically during the folding and unfolding.

Preferably, the folding drive mechanism of a folding scooter further a manual actuator assembly including a lever and a locking member, a second elongated slot is provided at a middle of the lever to allow the center shaft to pass through, a locking pin is provided at a lower end of the lever, a third elongated slot is provided at the drive rod, and the locking pin is inserted into the third elongated slot; the locking member is pivoted on the rear frame by means of the center shaft and connected with the push shaft, a notch is provided at a lower end of the locking member to engage with the locking pin. In such a way, a manual operation can be achieved, since the locking pin can be disengaged from the locking member by operating the lever.

Preferably, a third spring is arranged between the locking pin and the third spring, thereby maintaining an engagement between the locking pin and the notch. By means of the third spring, the locking pin can be engaged with the notch automatically, thereby the automatic actuator can actuate the drive rod to achieve automatic folding in the normal condition.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

A distinct and full description of the technical solution of the present invention will follow by combining with the accompanying drawings.

Figure 1:
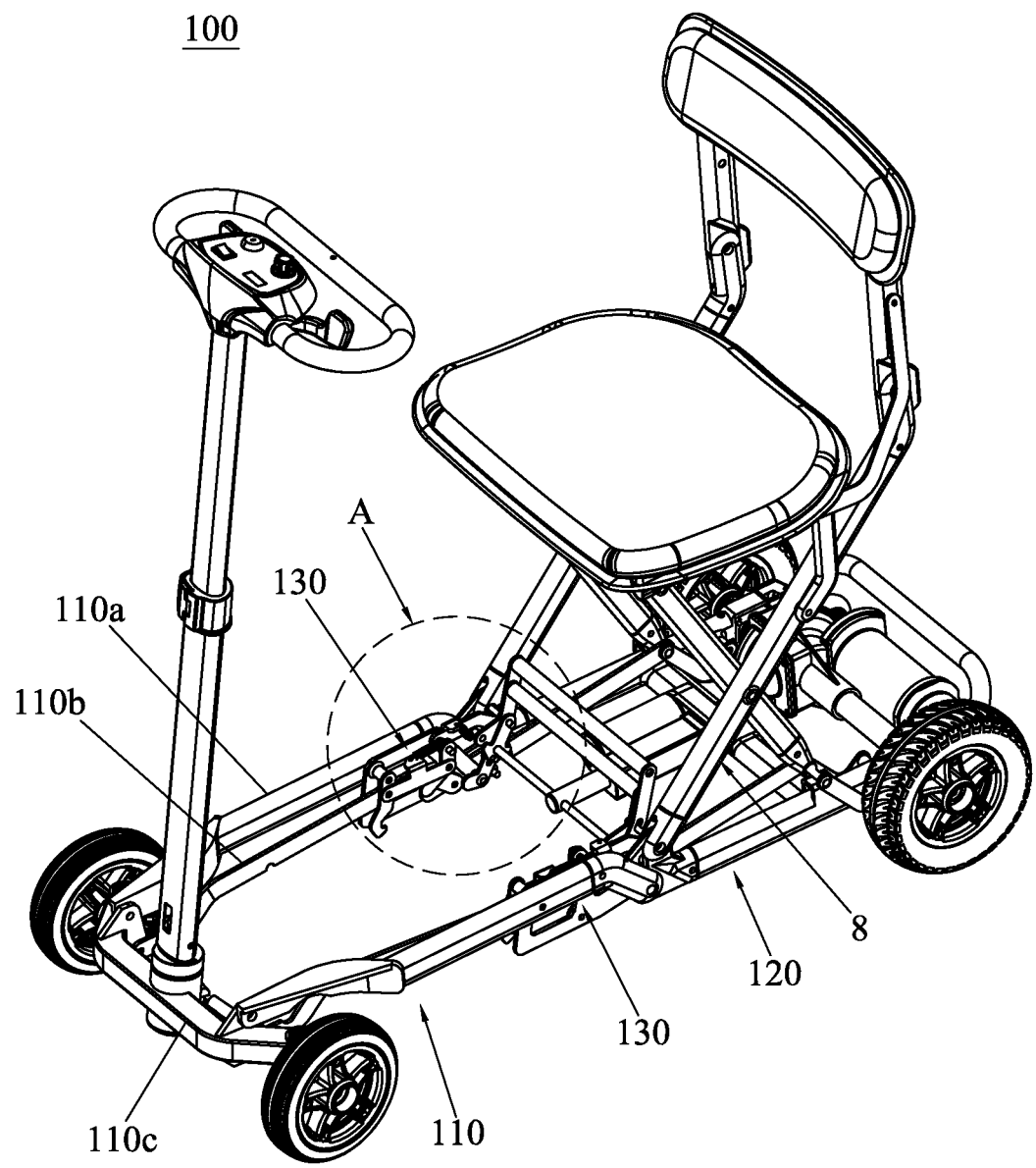
FIG. 1 is a perspective view of a folding scooter under an unfold status according to one embodiment of the present invention.

Referring to FIG. 1, the folding frame 100 includes a front frame 110, a rear frame 120 and a folding drive mechanism 130, the front frame 110 is pivotally connected with the rear frame 120, and the folding device mechanism 130 is arranged between the front frame 110 and the rear frame 120. Specifically, the front frame 110 includes a front beam 110a, a front bar 110b and a cross bar 110c, a rear end of the front beam 110a is pivotally connected to a front end of the rear frame 120, a front end of the front beam 110a is pivotally connected to the cross bar 110c, a front end of the front bar 110b is pivotally connected to the cross bar 110c, and the front beam 110a is provided with an installing frame 110d. More specifically, the front frame 110 and the rear front 120 are symmetrical, thus the folding drive mechanism 130 is configured at opposite inner sides of the folding frame 100.

Figure 2:
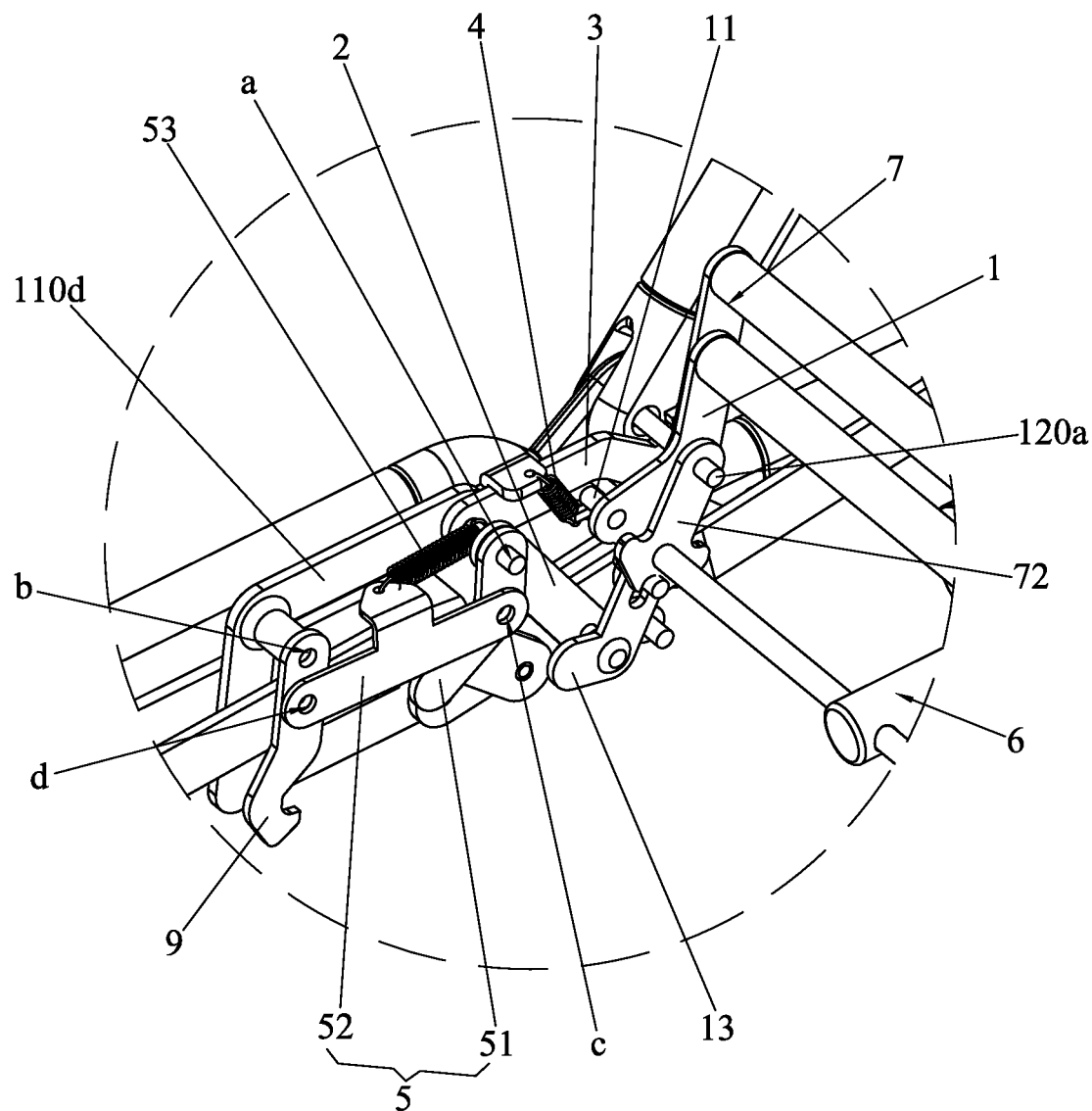
FIG. 2 is an enlarged view of the A portion shown in FIG. 1.
Figure 3:
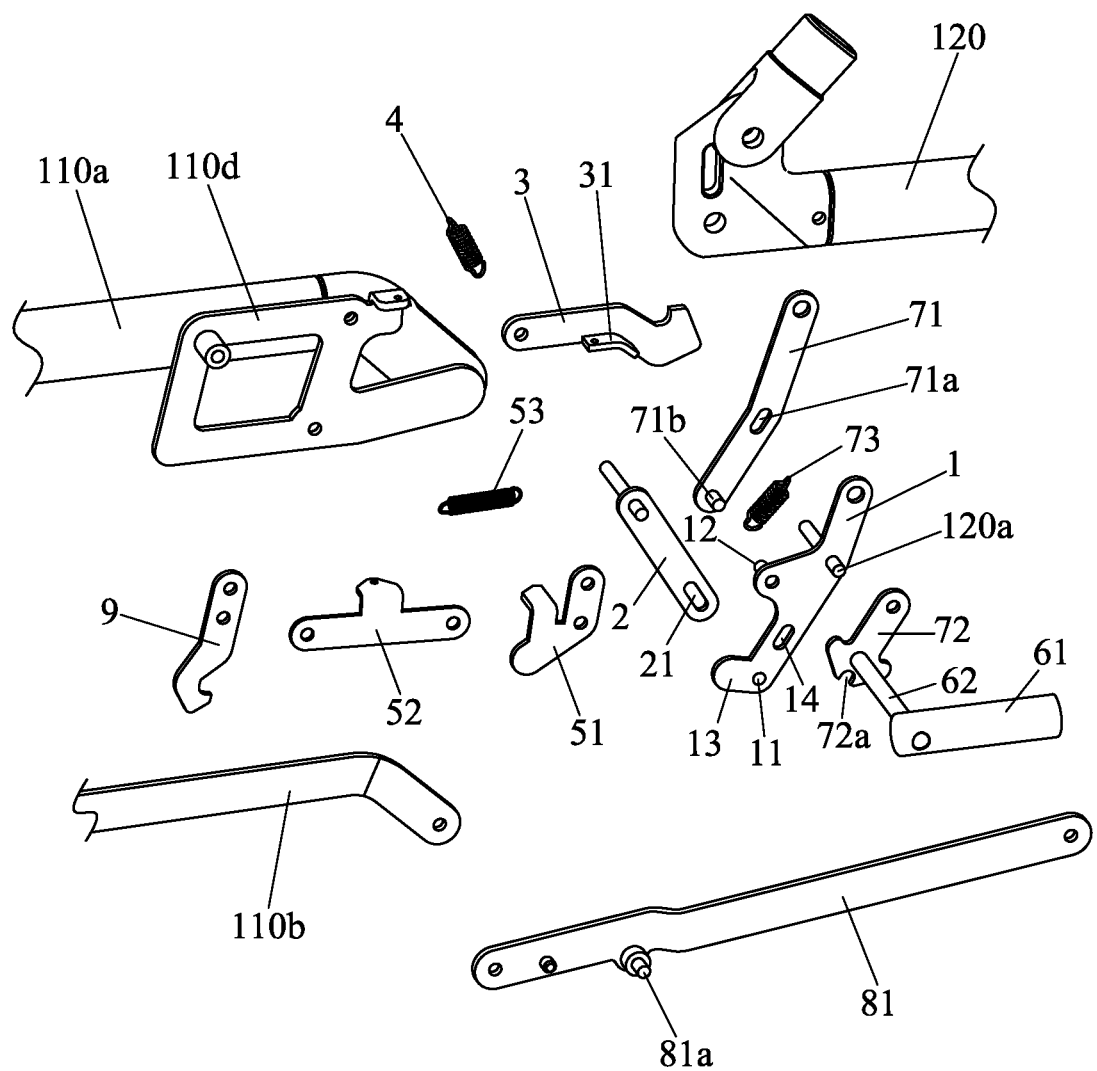
FIG. 3 is an exploded view of a folding drive mechanism according to one embodiment of the present invention.
Figure 4:
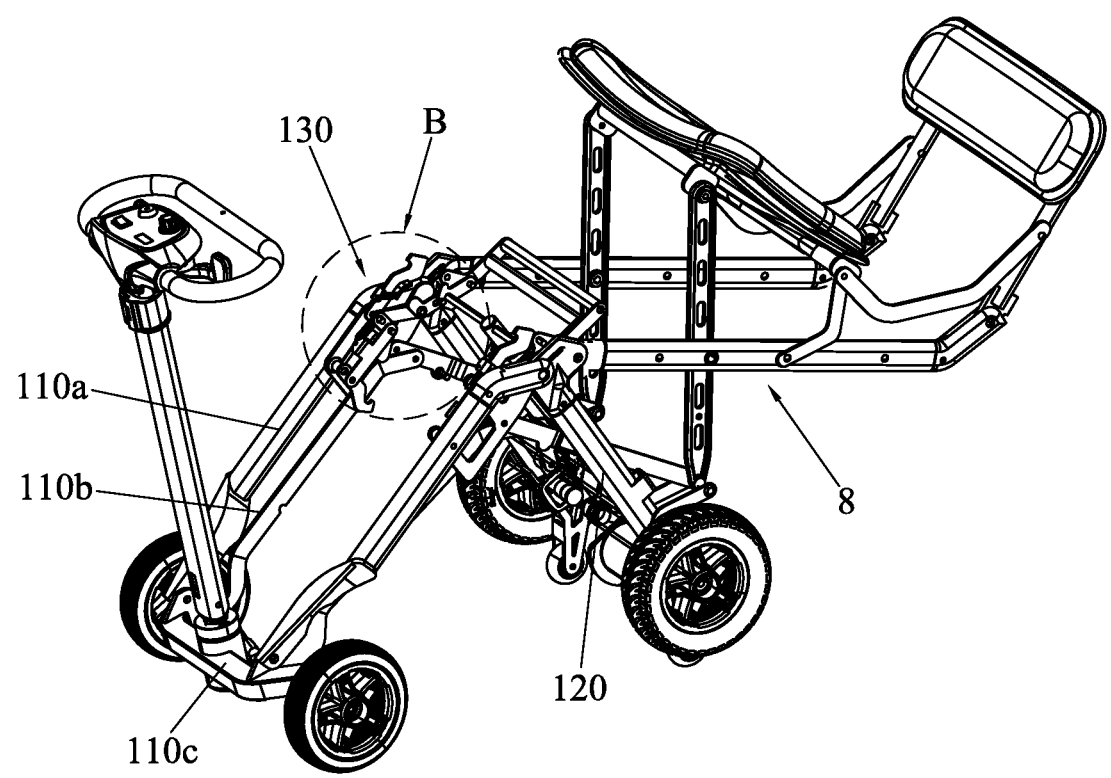
FIG. 4 is a schematic view of the folding scooter during folding.
Figure 5:
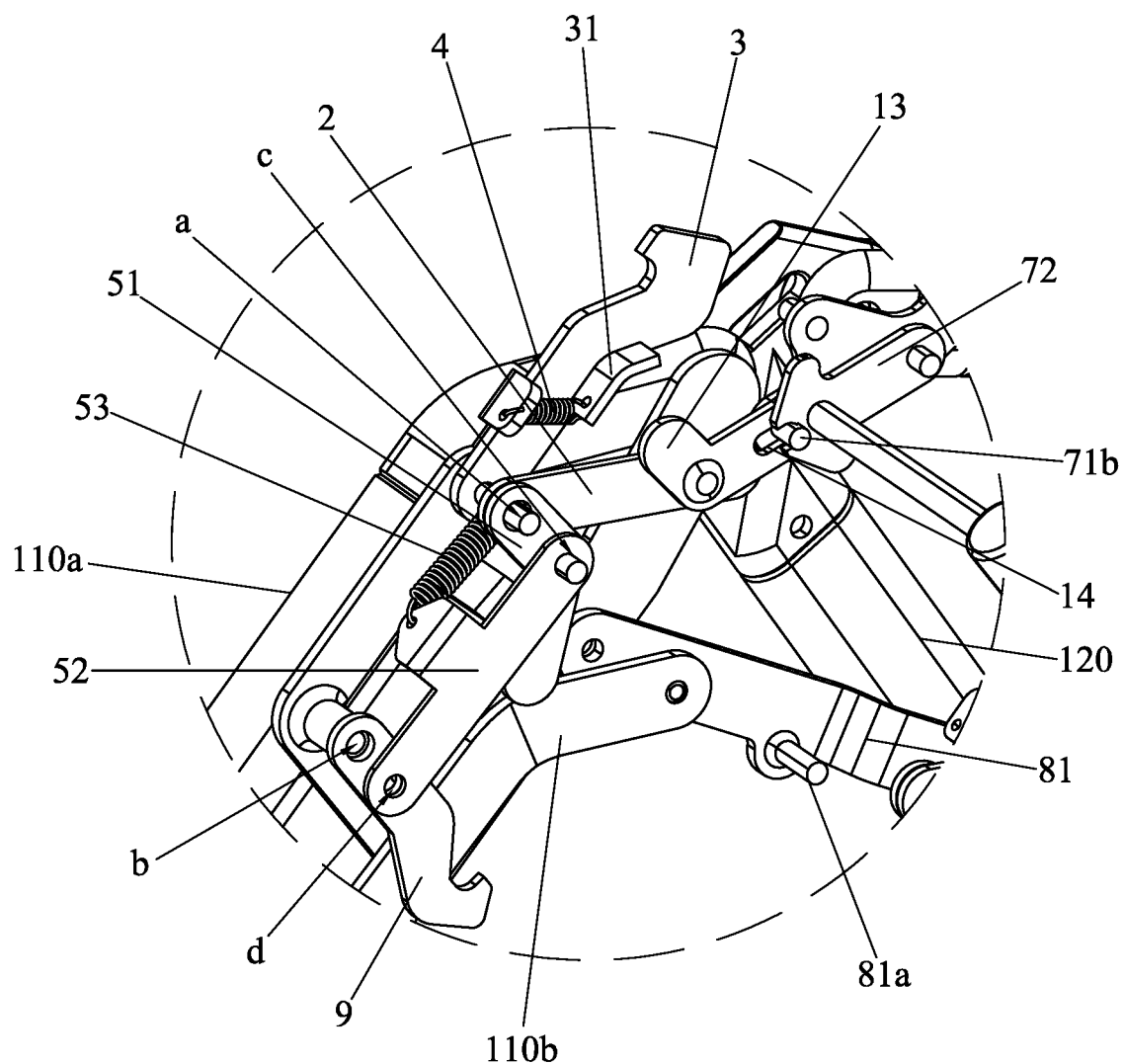
FIG. 5 is an enlarged view of the B portion shown in FIG. 4.
Figure 6:
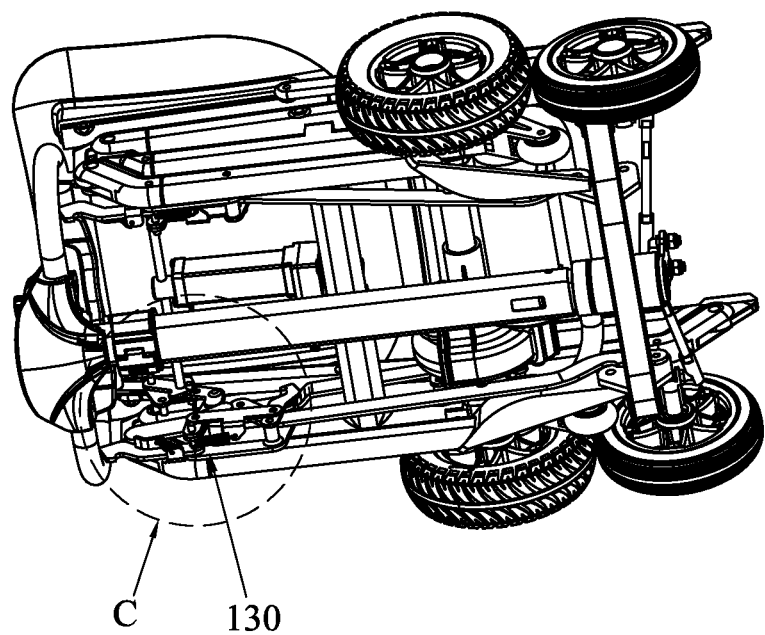
FIG. 6 is a schematic view of the folding scooter after complete folding.
Figure 7:
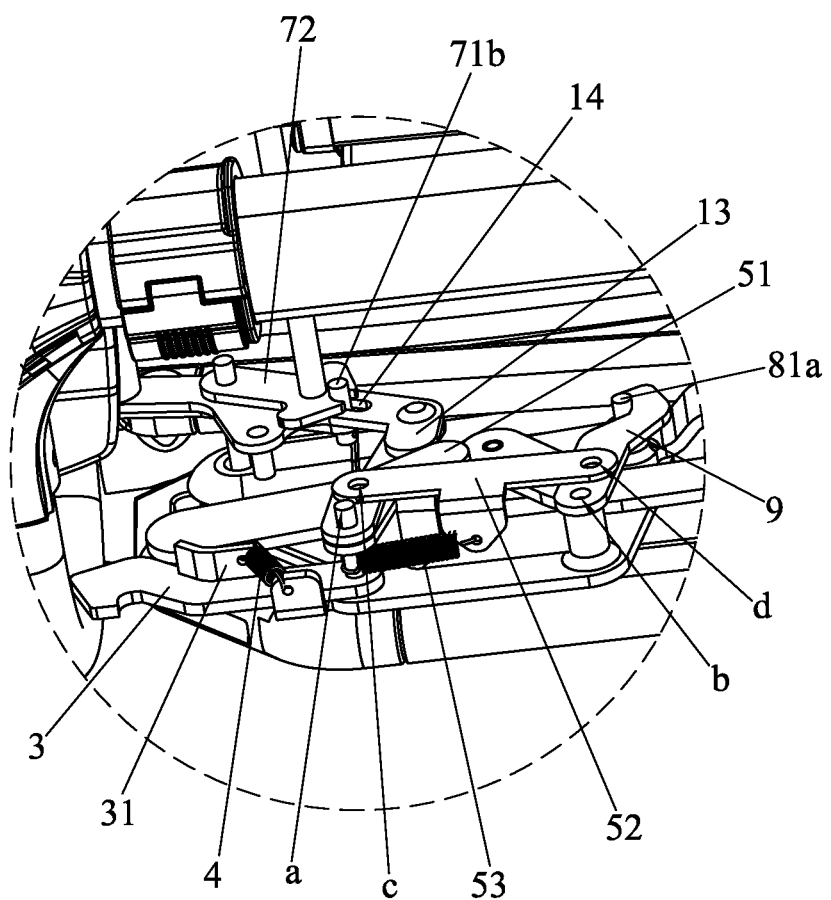
FIG. 7 is an enlarged view of the C portion shown in FIG. 6.
Figure 8:
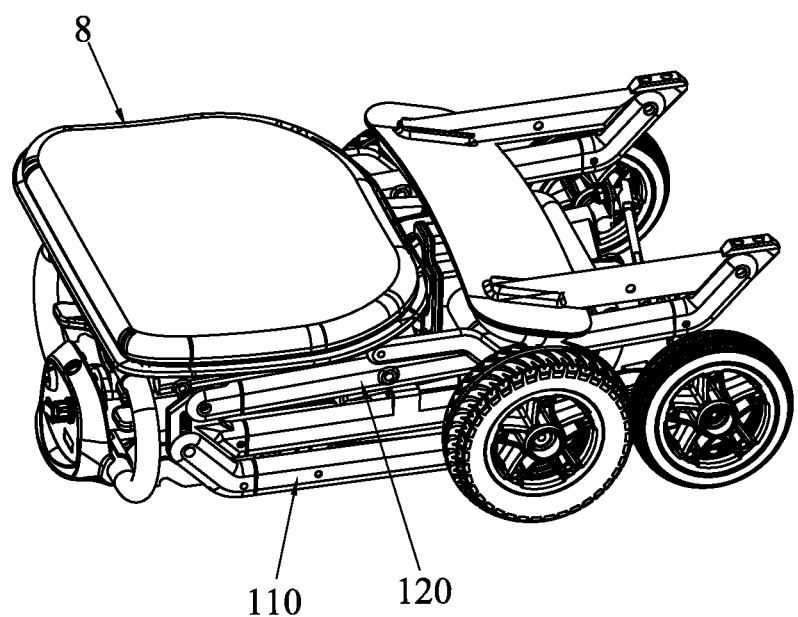
FIG. 8 is another perspective of the folding scooter after complete folding.

Referring to FIGS. 1 to 3, the folding drive mechanism 130 includes a drive rod 1, a pull rod 2, a first hook 3 and a first spring 4. Specifically, the drive rod 1 is pivoted on the rear frame 120 by means of a center shaft 120a, one end of the pull rod 2 is pivoted on the installing frame 110d, with a pivot a; the other end of the pull rod 2 is provided with an elongated slot 21 in which a first shaft pin 11 at a lower end of the drive rod 1 is slidably inserted. The first hook 3 is pivoted on the installing frame 110d, with the pivot a, namely the first hook 3 and the pull rod 2 are pivotally connected at the same pivot axis, another end of the first hook 3 is hooked on the rear frame 120, specifically hooked on the center shaft 120a. A second shaft pin 12 is provided at the middle of the drive rod 1, a pressing portion 31 is extended from the middle of the first hook 3, and the second shaft pin 12 is pressed against the pressing portion 31. The first spring 4 is configured between the front frame 110 and the first hook 3 to provide a pull force, by means of the first spring 4, the first hook 3 can hook on the center shaft 120a automatically when the front frame 110 and the rear frame 120 are completely unfolded, so that the rear frame 120 can be locked thereby preventing an unexpected folding and improving safety accordingly.

Referring to FIGS. 2-3 and 4-7, the folding drive mechanism 130 further include a second hook 9 and a linkage assembly 5 for actuating the second hook 9 to engage with or disengage from the rear frame 120. Specifically, the second hook 9 is pivoted on the installing frame 110d, with a pivot b. After folding, the second hook 9 can be hooked on the rear frame 120 to lock the front frame 110 and the rear frame 120 at the folding status. Specifically, the rear frame 120 is provided with a seat folding support 8, a linkage bar 81 is provided at the seat folding support 8, and a engaging portion 81a is formed on the linkage bar 81 to engage with the second hook 9. The linkage assembly 5 includes a trigger bar 51, a connecting bar 52 and a second spring 53. Specifically, the trigger bar 51 is bent and pivoted on the installing frame 110d, with a pivot a, namely the trigger bar 51 and the pull rod 2 are pivotally connected at the same pivot axis. The ends of the connecting bar 52 are pivotally connected to the middles of the trigger bar 51 and the second hook 9 respectively, with pivots c and 6. As shown, the lower end of the drive rod 1 is provided with a trigger part 13, before the frame 100 is unfolded, the trigger bar 51 is actuated under the pressing action of the trigger part 13, so as to push the second hook 9 to disengage from the rear frame 120. A third spring 53 is formed between the front frame 120 and the connecting bar 52, so as to make the second hook 9 hook on the rear frame 120 automatically once the front frame 110 is folded relative to the rear frame 120. By means of the trigger part 13 and the linkage between the trigger bar 51 and the connecting bar 52, the second hook 9 can be firstly actuated by the trigger part 13, while the drive rod is rotated initially, so that the second hook 9 disengages from the rear frame 120 to unlock the rear frame 110 and the front frame 120 before they are unfolded. By means of the second spring 53, the second hook 9 can be locked on the rear frame 120 automatically when the front frame 110 and the rear frame 120 are folded completely, so as to prevent an unexpected folding.

Referring to FIGS. 1-5, the folding drive mechanism further includes an automatic actuator assembly 6 and a manual actuator assembly 7, and the automatic actuator assembly 6 includes a linear actuator 61 and a push shaft 62, the rear end of the linear actuator 61 is pivoted on the rear frame 120, the push shaft 62 is fixed on the telescopic end of the linear actuator 61, and the two ends of the push shaft 62 is adapted for actuating the drive rod 1 to swing. By means of the linear actuator 61 and the push shaft 62, the drive rod 1 is capable of swinging while the frame is folding or unfolding, thus the operation is quite convenient. The manual actuator assembly 7 includes a lever 71 and a locking member 72, a second elongated slot 71a is provided at the middle of the lever 71 and adapted for engaging with the center shaft 120a, and a locking pin 71b is provided at the lower end of the lever 71. A third elongated slot 14 is provided at the drive rod 1, and the locking pin 71b is inserted in to the elongated slot 14. The locking member 72 is pivoted on the rear frame 120 by means of the center shaft 120a and connected with the push shaft 62. A notch 72a is formed on the lower portion of the locking member 72 to engage with the locking pin 71b. Further, the manual actuator assembly 7 includes a third spring 73 arranged between the locking pin 71b and the center shaft 120a, so that the engagement between the notch 72a and the locking pin 71b is kept. By means of the lever 71, the locking pin 71b can be disengaged from the locking member 72 by operating the lever 71, so that the drive rod 1 is beyond control of the automatic actuator assembly 6, thereby manual driving is achieved and manual folding and unfolding is achieved accordingly. Due to the third spring 73, the locking pin 71b can be engaged with the notch 72a, so that the drive rod 1 can be driven by the automatic actuator assembly 6 under the normal state, to achieve the automatic folding and unfolding.

In conclusion, detailed working principle of the folding frame 100 of the present invention follow, in combination of FIGS. 1, 4, 6 and 8.

When the folding frame 100 is in unfold position, both of the front beam 110a and the rear frame 120 are horizontal substantially, and the telescopic end of the linear actuator 61 is protruded, the first shaft pin 11 is located within the lower end of the first elongated slot 21, the locking pin 71b is located within the lower end of the second slot 71a to engage with the notch 72a, and the first hook 3 is hooked on the center shaft 120a to lock the front frame 110 and the rear frame 120.

When there is a need to fold the folding frame 100 automatically, starting up the linear actuator 61 to make its telescopic end withdraw, thus the push shaft 62 is actuated to move, accordingly the lower end of the drive rod 1 is pivoted around the center shaft 120 under the linkage of the locking member 72 and the locking pin 71b. During the initial rotation of the drive rod 1, the first shaft pin 11 sliders from the upper end of the first elongated slot 1 to the lower end, thus the pull rod 2 will not be actuated by the drive rod 1. On the other hand, the second shaft pin 12 follow the drive rod 1 to move downwards, so as to push against the pressing portion 31 of the first hook 3, thereby causing the first hook to disengage from the center shaft 120a. When the first shaft pin 11 reaches to the lower end of the first elongated slot 21, the first hook 3 completely disengages from the center shaft 120a; at this time, continuing to pivot the drive rod 1 to cause the pull rod 2 to move, thus the front frame 110 is pivoted relative to the rear frame 120, thereby folding. Once the front frame 110 and the rear frame 120 are folded completely, the second hook 9 is hooked on the engaging portion 81a, so as to lock the folding frame 100 in the folding position.

When there is a need to unfold the folding frame 100, starting up the linear actuator 61 to make its telescopic end protrude, thus the push shaft 62 is actuated to move, accordingly the lower end of the drive rod 1 is pivoted around the center shaft 120 under the linkage of the locking member 72 and the locking pin 71b. During the initial rotation of the drive rod 1, the first shaft pin 11 sliders from the lower end of the first elongated slot 1 to the upper end, thus the pull rod 2 will not be actuated by the drive rod 1. On the other hand, the trigger bar 51 is pushed against the trigger part 13 of the drive rod 1, thus the trigger bar 51 is pivoted to actuate the connecting bar 52 to pivot accordingly, and in turn, the second hook 9 disengages from the engaging portion 81a. When the first shaft pin 11 reaches to the upper end of the first elongated slot 21, the second hook 9 completely disengages from the engaging portion 81a; at this time, continuing to pivot the drive rod 1 to cause the pull rod 2 to move, thus the front frame 110 is pivoted relative to the rear frame 120, causing the front frame 110 to be far from the rear frame 12, thereby unfolding. Once the front frame 110 and the rear frame 120 are unfolded completely, the first hook 3 is hooked on the engaging portion 81a, so as to lock the folding frame 100 in the unfolding position.

When there is a need to fold and unfold the folding frame 100 manually, pressing the lever 71 and then sliding it, causing the locking pin 71b of the lever 71 to slide from one end of the third elongated slot 14 to the other end to disengage from the notch 72a, thus the drive rod 1 is released from the locking member 72, that is, the drive rod 1 will not be controlled by the linear actuator 61. At this time, user may handle the drive rod 1 to fold or unfold the frame 100. Similarly, the working principle of the folding frame 100 by manual is the same with that by electric, thus is omitted here.

In comparison with the prior art, the drive rod 1 is pivoted on the rear frame 120, the pull rod 2 is pivoted on the front frame 110, the first elongated slot 21 is formed at the end of the pull rod 2, and the first shaft pin 11 of the drive rod 1 is inserted into the first elongated slot 21. Further, the first hook 3 is hooked on the rear frame 120, and the second shaft pin 12 of the drive rod 1 is pressed against the first hook, thus the front frame 110 and the rear frame 120 are locked in the unfold position. When folding, the drive rod 1 is driven to swing to cause the first hook 3 to disengage from the rear frame 120, thereby unlocking the front frame 110 and the rear frame 120; continuing to swing the drive rod 1, the pull rod 2 is linked, so that the front frame 110 and the rear frame 120 can be folded. By this token, the folding frame 100 can be folded or unfolded quickly only by driving the drive rod 1, and the operation is simple and convenient.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A folding drive mechanism of a folding scooter, arranged between a front frame and a rear frame of the folding scooter which are pivotally connected, and the folding drive mechanism comprising a drive rod and a pull rod, wherein the drive rod is pivoted on the rear frame via a center shaft, one end of the pull rod is pivoted on the front frame, and another end of the pull rod is connected to the drive rod, by driving the drive rod, the pull rod is actuated to cause the front frame to pivot relative to the rear frame thereby folding; wherein a first hook is included, one end of the pull rod is provided with a first elongated slot, a first shaft pin provided at a lower end of the drive rod is movably inserted into the first elongated slot, one end of the first hook is pivoted on the front frame, another end of the first hook is hooked on the rear frame, and a second shaft pin is provided at a middle of the drive rod and pressed against the first hook; when folding, the drive rod is rotated to cause the second shaft pin to push the first hook to disengage from the rear frame, thereby enabling the front frame to fold relative to the rear frame.

2. The folding drive mechanism according to claim 1, further comprising a first spring configured between the front frame and the first hook.

3. The folding drive mechanism according to claim 1, further comprising a second hook pivoted on the front frame, after folding, the second hook is hooked on the rear frame.

4. The folding drive mechanism according to claim 3, further comprising a linkage assembly for driving the second hook to engage with or disengage from the rear frame.

5. The folding drive mechanism according to claim 4, wherein the linkage assembly comprises an trigger bar pivoted on the front frame and a connecting bar, and two ends of the connecting bar are connected to the trigger bar and the second hook respectively, the lower end of the drive rod is provided with an trigger part; before unfolding, the trigger part is driven by the trigger bar, so as to push the second hook to disengage from the rear frame.

6. The folding drive mechanism according to claim 5, wherein the linkage assembly further comprises a second spring configured between the front frame and the rear frame, thereby enabling the second hook to hook on the rear frame.

7. The folding drive mechanism according to claim 1, further comprising an automatic actuator assembly including a linear actuator and a push shaft, a rear end of the linear actuator is pivoted on the rear frame, the push shaft is fixed to a telescopic end of the linear actuator, and the drive rod is driven by an end of the push shaft.

8. The folding drive mechanism according to claim 7, further comprising a manual actuator assembly including a lever and a locking member, a second elongated slot is provided at a middle of the lever to allow the center shaft to pass through, a locking pin is provided at a lower end of the lever, a third elongated slot is provided at the drive rod, and the locking pin is inserted into the third elongated slot; the locking member is pivoted on the rear frame by means of the center shaft and connected with the push shaft, a notch is provided at a lower end of the locking member to engage with the locking pin.

9. The folding drive mechanism according to claim 8, wherein a third spring is arranged between the locking pin and the center shaft, thereby maintaining an engagement between the locking pin and the notch.

\* \* \* \* \*